US012776052B2

(12) United States Patent
Guo et al.

(10) Patent No.: US 12,776,052 B2
(45) Date of Patent: Oct. 27, 2026

(54) CAMERA-AGNOSTIC DEPTH ESTIMATION VIA TRAINING A 360-DEGREE-IMAGE-BASED DEPTH MODEL

(71) Applicant: Robert Bosch GmbH, Stuttgart (DE)

(72) Inventors: Yuliang Guo, Palo Alto, CA (US); Seyedmahdi Hosseinimiangoleh, North Vancouver (CA); Ruoyu Wang, Sunnyvale, CA (US); Cheng Zhao, Milpitas, CA (US); Xinyu Huang, San Jose, CA (US); Liu Ren, Saratoga, CA (US)

(73) Assignee: Robert Bosch GmbH (DE)

( * ) Notice: Subject to any disclaimer, the term of this patent is extended or adjusted under 35 U.S.C. 154(b) by 229 days.

(21) Appl. No.: 18/679,755

(22) Filed: May 31, 2024

(65) Prior Publication Data

US 2025/0371725 A1 Dec. 4, 2025

(51) Int. Cl.
*G06T 7/50* (2017.01)
*G06T 3/08* (2024.01)

(52) U.S. Cl.
CPC .................. *G06T 7/50* (2017.01); *G06T 3/08* (2024.01); *G06T 2207/20084* (2013.01)

(58) Field of Classification Search
CPC ... G06T 3/08; G06T 7/50; G06T 2207/20081; G06T 2207/20084
See application file for complete search history.

(56) References Cited

U.S. PATENT DOCUMENTS

| | | | | |
|---|---|---|---|---|
| 10,979,633 | B1 * | 4/2021 | Blanchet | G03B 29/00 |
| 2017/0244948 | A1 * | 8/2017 | Pang | H04N 23/957 |
| 2018/0302614 | A1 * | 10/2018 | Toksvig | G06V 30/1914 |
| 2019/0087978 | A1 * | 3/2019 | Tourapis | G06T 3/08 |
| 2020/0228777 | A1 * | 7/2020 | Dore | G06T 15/20 |
| 2021/0112236 | A1 * | 4/2021 | Fleureau | H04N 13/275 |
| 2022/0138978 | A1 * | 5/2022 | Yan | G06T 3/18 382/154 |
| 2022/0207756 | A1 * | 6/2022 | Ren | G06T 3/4038 |
| 2022/0414909 | A1 * | 12/2022 | Kim | G06N 5/02 |
| 2023/0094308 | A1 * | 3/2023 | Yang | G06V 10/7792 382/154 |
| 2024/0155093 | A1 * | 5/2024 | Pohl | H04N 13/271 |

(Continued)

OTHER PUBLICATIONS

Aso et al. "Portable 3D human pose estimation for human-human interaction using a chest-mounted fisheye camera." Proceedings of the Augmented Humans International Conference 2021. 2021. (Year: 2021).*

(Continued)

*Primary Examiner* — Katrina R Fujita
(74) *Attorney, Agent, or Firm* — Dickinson Wright PLLC

(57) ABSTRACT

A method of performing depth estimation for images includes, at one or more processing devices receiving an input image captured by a camera, converting the input image to an equirectangular (ERP) image in an ERP space, performing depth estimation for the ERP image by using an ERP depth model to determine respective distances of features in the ERP image from the camera and generate a depth estimation output based on the respective distances, and controlling one or more functions of a device based on the depth estimation output.

17 Claims, 13 Drawing Sheets

(56) References Cited

U.S. PATENT DOCUMENTS

| | | | | |
|---|---|---|---|---|
| 2024/0355125 A1* | 10/2024 | Nagori | .................. | G06V 20/56 |
| 2025/0166118 A1* | 5/2025 | Gond | ........................ | G06T 3/12 |

OTHER PUBLICATIONS

Fraser et al. "Monocular depth estimation for equirectangular videos." 2022 IEEE/RSJ International Conference on Intelligent Robots and Systems (IROS). IEEE, 2022. (Year: 2022).*

Lin et al. "360° map establishment and real-time simultaneous localization and mapping based on equirectangular projection for autonomous driving vehicles." Sensors 23.12 (2023): 5560. (Year: 2023).*

He et al. "SPCNet: A Panoramic image depth estimation method based on spherical convolution." 2021 International Conference on Visual Communications and Image Processing (VCIP). IEEE, 2021. (Year: 2021).*

Li et al. "Omnifusion: 360 monocular depth estimation via geometry-aware fusion." Proceedings of the IEEE/CVF Conference on Computer Vision and Pattern Recognition. 2022. (Year: 2022).*

Rey-Area et al. "360monodepth: High-resolution 360deg monocular depth estimation." Proceedings of the IEEE/CVF Conference on Computer Vision and Pattern Recognition. 2022. (Year: 2022).*

Tateno et al. "Distortion-aware convolutional filters for dense prediction in panoramic images." Proceedings of the European Conference on Computer Vision (ECCV). 2018. (Year: 2018).*

Bhat, Shariq Farooq, et al. "Zoedepth: Zero-shot transfer by combining relative and metric depth." arXiv preprint arXiv:2302.12288 (2023).

Godard, Clement, et al. "Digging into self-supervised monocular depth estimation." Proceedings of the IEEE/CVF international conference on computer vision. 2019.

Li, Yuyan, et al. "Omnifusion: 360 monocular depth estimation via geometry-aware fusion." Proceedings of the IEEE/CVF Conference on Computer Vision and Pattern Recognition. 2022.

* cited by examiner

CAMERA-AGNOSTIC DEPTH ESTIMATION VIA TRAINING A 360-DEGREE-IMAGE-BASED DEPTH MODEL

TECHNICAL FIELD

The present disclosure relates to artificial intelligence (AI) techniques for image recognition and processing.

BACKGROUND

Various systems are configured to perform tasks using machine learning (ML) or other artificial intelligence (AI) techniques. For example, systems configured to perform image recognition, object detection, and/or other automated tasks may implement AI techniques. As one example, image detection systems and methods use various detection models trained for object and feature detection.

SUMMARY

A method of performing depth estimation for images includes, at one or more processing devices receiving an input image captured by a camera, converting the input image to an equirectangular (ERP) image in an ERP space, performing depth estimation for the ERP image by using an ERP depth model to determine respective distances of features in the ERP image from the camera and generate a depth estimation output based on the respective distances, and controlling one or more functions of a device based on the depth estimation output.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods. Further embodiments include a machine that is configured to carry out the various steps of any of the foregoing methods.

Other aspects and advantages of the invention will become apparent from the following detailed description taken in conjunction with the accompanying drawings that illustrate, by way of example, the principles of the described embodiments.

DETAILED DESCRIPTION

Figure 1:
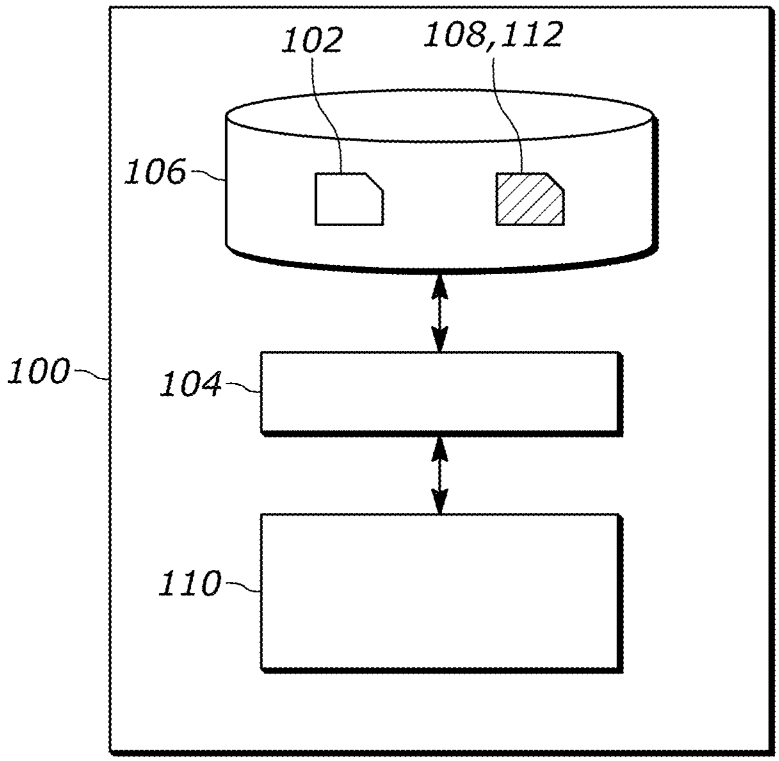
FIG. 1 generally illustrates a system for training a machine learning model according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative bases for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical application. Various combinations and modifications of the features consistent with the teachings of this disclosure, however, could be desired for particular applications or implementations.

"A", "an", and "the" as used herein refers to both singular and plural referents unless the context clearly dictates otherwise. By way of example, "a processor" programmed to perform various functions refers to one processor programmed to perform each and every function, or more than one processor collectively programmed to perform each of the various functions.

As used herein, "content" may refer to original content corresponding to the input data (e.g., data representative of a captured image, video, sound, text, etc.) or synthesized content (e.g., a synthesized image, video, sound, text, etc.).

In some examples, "content" may include images, which may correspond to captured images, synthesized images, or combinations thereof. Images may be represented by image data. In some contexts herein, the terms "image" and "image data" may be used interchangeably and may refer to actual pixel values, color channels, vectors, and/or binary data corresponding to visual content of an image. In an example, "image" and/or "image data" refer to a raw representation of an image, such as an array of numerical values representing pixel intensities, which in some examples may include preprocessed data that originated from an image sensor. Conversely, "metadata" or "image metadata" may refer to contextual or supplementary details about the image, such as image size, format, creation date, geolocation data, and the like. In various examples, an "image" and "image data" may, but do not necessarily, further include metadata.

Depth estimation for images captured by a monocular (i.e., single lens) camera may be a challenge in applications requiring dense three-dimensional (3D) perception of environment, including, but not limited to, autonomous s vehicles, robotics and augmented/virtual reality (AR/VR) systems. However, the effectiveness of depth estimation is highly dependent on the camera lens/type used to obtain training data (i.e., the training data used to train an AI/ML model performing the depth estimation). For example, the accuracy of the depth estimation can decrease significantly for image data captured using a camera (e.g., a "test camera") a having a different lens than the camera used to obtain the training data (e.g., a "training camera"). Conversely, training the model using multiple types of training cameras and lenses is costly and time consuming.

Systems and methods according to the present disclosure are configured to implement camera-agnostic training techniques to train a model (e.g., a vision model or other model configured to perform vision-based tasks) to perform accurate depth estimation. The trained vision model is configured to perform depth estimation for images captured from multiple types of cameras and lenses. While described herein with respect to monocular depth estimation, the principles of the present disclosure may also be implemented for stereo depth estimation.

In an example, the vision model is trained using captured images from multiple cameras that are first converted or transformed to a "representative" format or image (which, in some examples, may be referred to as a representative image, a reference image, a canonical image, etc.). In one example, the representative image is an equirectangular projection (ERP) image (which, in some contexts, may be referred to as a 360 image or 360 degree image, a panoramic image, etc.). Captured images (e.g., from multiple types of cameras/lenses) are projected onto a region on a surface of a unit sphere, the entire surface of which can then be unwrapped/unfolded onto a rectangular plane. In other words, while an ERP image is the result of projecting a spherical image onto a rectangular plane, systems and methods according to the present disclosure are configured to first project captured images onto a spherical surface and then unfold the spherical image onto the rectangular plane to obtain ERP images. The ERP images are used to train a vision or depth estimation model to perform depth estimation. The term "spherical," as used herein in the context of lens and images, may refer to lens and images having spherical or semi-spherical, curved, convex, concave, or other distorted or non-equirectangular characteristics.

A vision model trained with ERP images according to the principles of the present disclosure can be used to estimate depth for any camera lens or type. However, because ERP images with ground-truth are rare and costly to collect, training a robust vision model for depth estimation is still challenging. Accordingly, instead of collecting a large amount of ERP images associated with ground-truth depth maps, systems and methods of the present disclosure are configured to train a vision model using a large number of regular (i.e., non-ERP) images with ground-truth depth labels or maps (e.g., images available from public datasets that include ground-truth depth maps). Vision model trained according to the principles of the present disclosure may be referred to as an ERP depth model.

FIG. 1 shows one example system 100 for training of an ML or other AI model, such as a vision or depth estimation model (an "ERP depth model") according to the present disclosure. As used herein, for simplicity, "vision" model may refer to a depth estimation model (or vice versa) or ERP depth model, a vision model configured to perform depth estimation, etc. The system 100 may be configured to (and/or include circuitry configured to) implement the systems and methods of the present disclosure described below in more detail. The system 100 may comprise an input interface for accessing training data 102 for the vision model. For example, as illustrated in FIG. 1, the input interface may be constituted by a data storage interface 104 which may access the training data 102 from data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also external data storage, e.g., network-accessible data storage.

In some embodiments, the data storage 106 may further comprise a data representation 108 of an untrained version of the vision model which may be accessed by the system 100 from the data storage 106. It will be appreciated, however, that the training data 102 and the data representation 108 of the untrained vision model may also each be accessed from different data storage, e.g., via a different subsystem of the data storage interface 104. Each subsystem may be of a type as is described above for the data storage interface 104.

In some embodiments, the data representation 108 of the untrained vision model may be internally generated by the system 100 on the basis of design parameters for the vision model, and therefore may not explicitly be stored on the data storage 106. The system 100 may further comprise a processor subsystem 110 which may be configured to, during operation of the system 100, provide an iterative function as a substitute for a stack of layers of the vision model to be trained. Here, respective layers of the stack of layers being substituted may have mutually shared weights and may receive, as input, an output of a previous layer, or for a first layer of the stack of layers, an initial activation, and a part of the input of the stack of layers.

The processor subsystem 110 may be further configured to iteratively train the vision model using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the vision model. The processor subsystem 110 is configured to train the vision model in accordance with systems and methods of the present disclosure as described below in more detail.

The system 100 may further comprise an output interface for outputting a data representation 112 of the trained vision model. This data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' vision model may, during or after the training, be replaced, at least in part by the data representation 112 of the trained vision model, in that the parameters of the vision model, such as weights, hyperparameters and other types of parameters of vision models, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' vision model. In some embodiments, the output interface may be separate from the data storage interface 104, but may in general be of a type as described above for the data storage interface 104.

Figure 2:
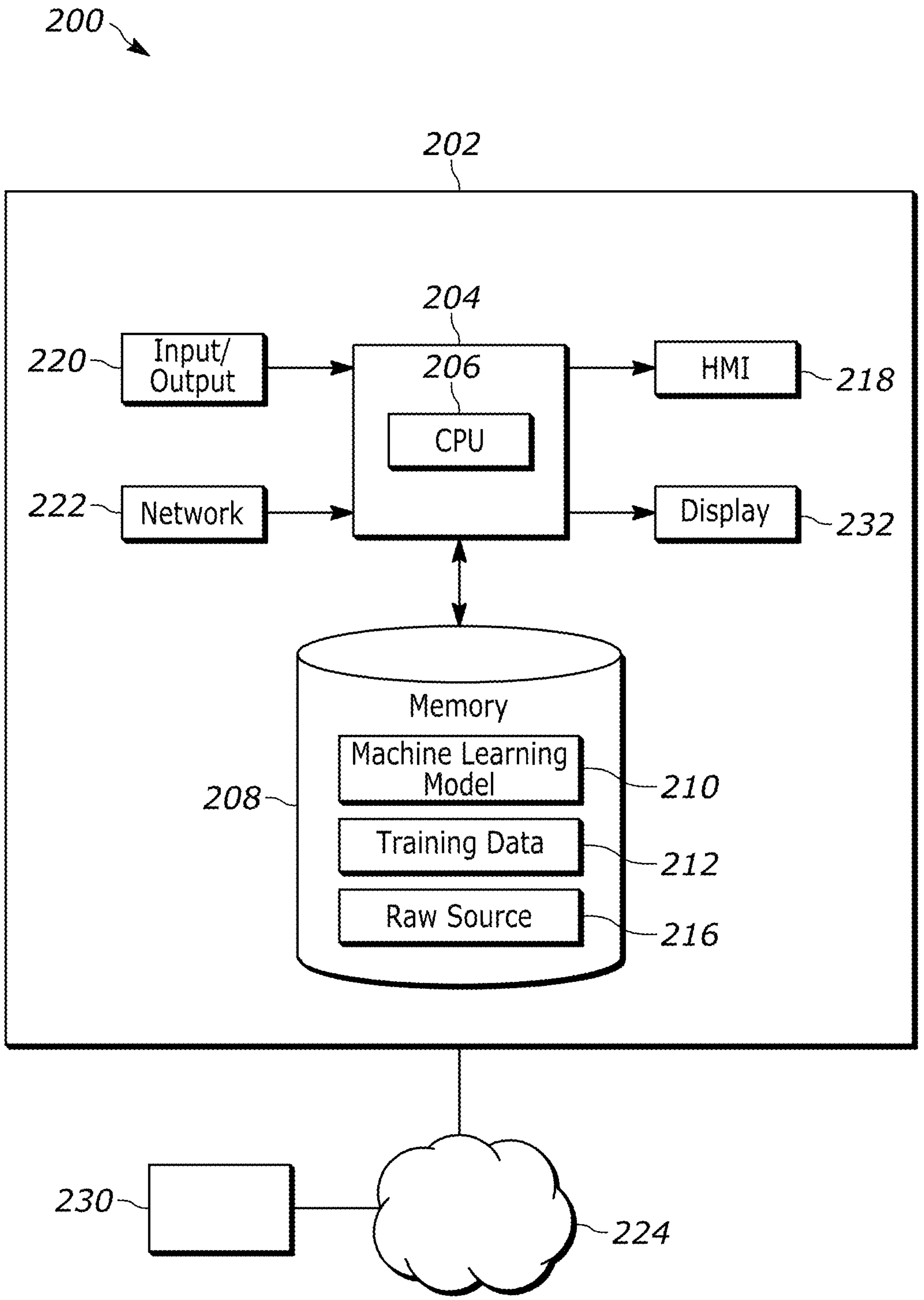
FIG. 2 generally illustrates a computer-implemented method for training and implementing a machine learning model according the principles of the present disclosure.

FIG. 2 depicts an example content generation system 200 configured to (and/or including circuitry configured to) implement a system for, annotating, augmenting, and/or generating data. In some examples, the content generation system 200 is configured to perform noising and/or denoising of input data to generate content. The content generation system 200 may include at least one computing system 202 configured to implement all or portions of the systems and methods of the present disclosure explained below in more detail. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction set such as one of the x86, ARM, Power, or MIPS instruction set families. Various components of the system 200 may be implemented with same or different circuitry.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store one or more machine learning models (e.g., represented in FIG. 2 as the machine learning model 210) or algorithms, a training dataset 212 for the machine learning model 210, raw source dataset 216, etc.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement the machine learning model 210 to analyze the raw source dataset 216. For example, the CPU 206 and/or other circuitry may implement the machine learning model 210. The raw source dataset 216 may include raw or unprocessed sensor data that may be representative of an input dataset for a machine learning system. The raw source dataset 216 may include images, video, video segments, audio, text-based information, and raw or partially processed sensor data (e.g., a radar map of objects). In some embodiments, the machine learning model 210 may include a deep-learning or neural network algorithm that is designed to perform a predetermined function. For example, the neural network algorithm may be configured to identify events or objects in images or video segments based on audio data.

The computer system 202 may store the training dataset 212 for the machine learning model 210. The training dataset 212 may represent a set of previously constructed data for training the machine learning model 210. The training dataset 212 may be used by the machine learning model 210 to learn various conditions and other factors (e.g., weighting factors) associated with an ML algorithm. The training dataset 212 may include a set of source data that has corresponding outcomes or results that the machine learning model 210 tries to duplicate via the learning process.

The machine learning model 210 may be operated in a learning mode using the training dataset 212 as input. The machine learning model 210 may be executed over a number of iterations using the data from the training dataset 212. With each iteration, the machine learning model 210 may update internal weighting factors based on the achieved results. For example, the machine learning model 210 can compare output results (e.g., generated content) with those included in the training dataset 212. Since the training dataset 212 includes the expected results, the machine learning model 210 can determine when performance is acceptable. After the machine learning model 210 achieves a predetermined performance level (e.g., 100% agreement with the outcomes associated with the training dataset 212), the machine learning model 210 may be executed using data that is not in the training dataset 212. The trained machine learning model 210 may be applied to new datasets to generate content. The machine learning model 210 may include a vision model trained in accordance with systems and methods of the present disclosure.

The machine learning model 210 may be configured to identify a particular feature in the raw source data 216. The raw source data 216 may include a plurality of instances or input dataset for which output results are desired (e.g., an image, a video stream or segment including audio data, etc.). For example only, the machine learning model 210 may be configured to identify objects or features in an image, objects or events in a video segment based on audio data, etc. In some examples, the machine learning model 210 may be configured to annotate identified objects, features, or events. The machine learning model 210 may be configured to perform depth estimation according to the principles of the present disclosure. The machine learning model 210 may be programmed to process the raw source data 216 to identify the presence of the particular features. The machine learning model 210 may be configured to identify a feature in the raw source data 216 as a predetermined feature. The raw source data 216 may be derived from a variety of sources. For example, the raw source data 216 may be actual input data collected by a machine learning system. The raw source data 216 may be machine generated for testing the system. As an example, the raw source data 216 may include raw image data, raw video and/or audio data from a camera, audio data from a microphone, etc.

In an example, the machine learning model 210 may process raw source data 216 and output video and/or audio data including one or more indications of an identified event. The machine learning model 210 may generate a confidence level or factor for each output generated. For example, a confidence value that exceeds a predetermined high-confidence threshold may indicate that the machine learning model 210 is confident that the identified event (or feature) corresponds to the particular event. A confidence value that is less than a low-confidence threshold may indicate that the machine learning model 210 has some uncertainty that the particular feature is present.

Figure 3A:
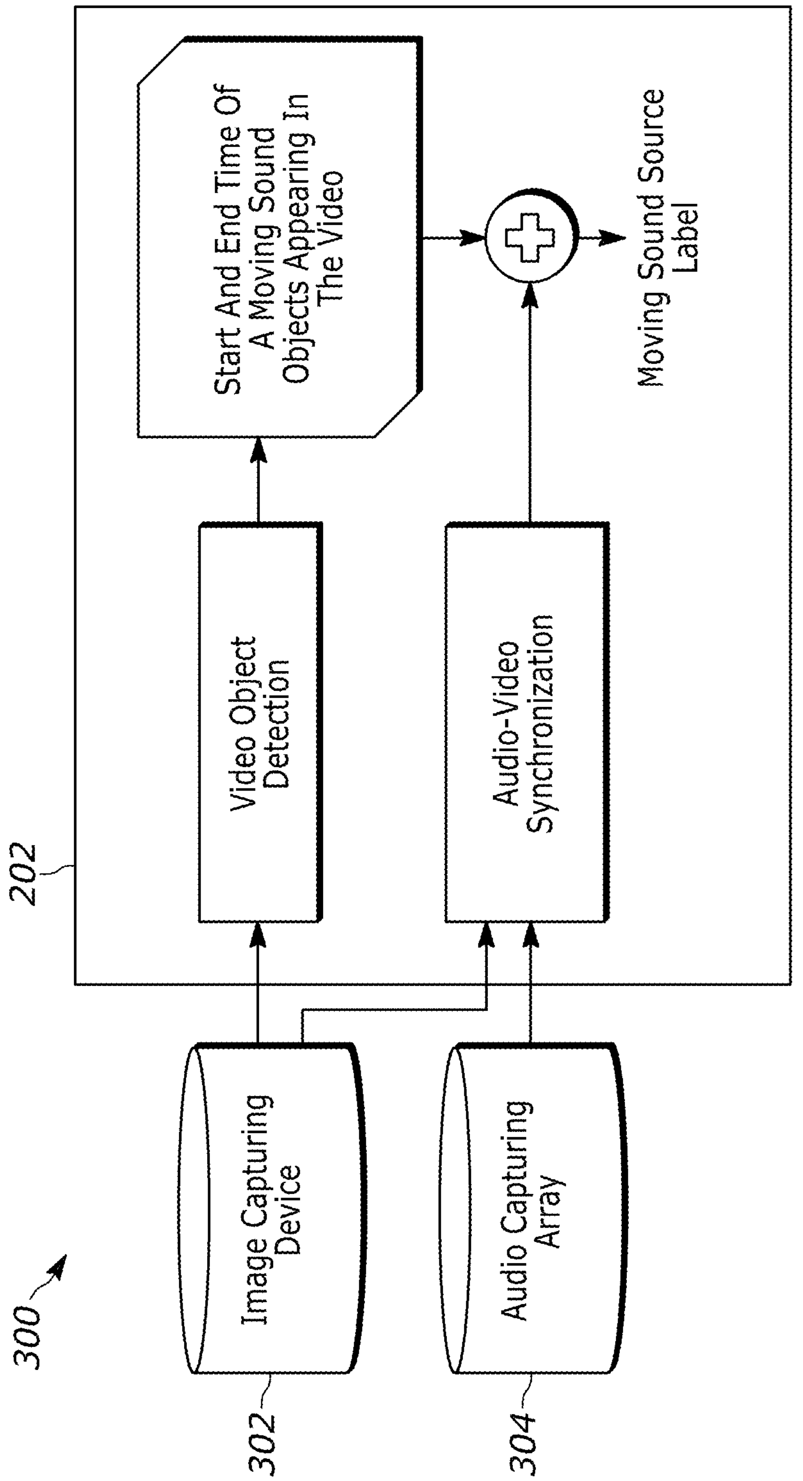
FIG. 3A generally illustrates an audio data labeling system according to the principles of the present disclosure.
Figure 3B:
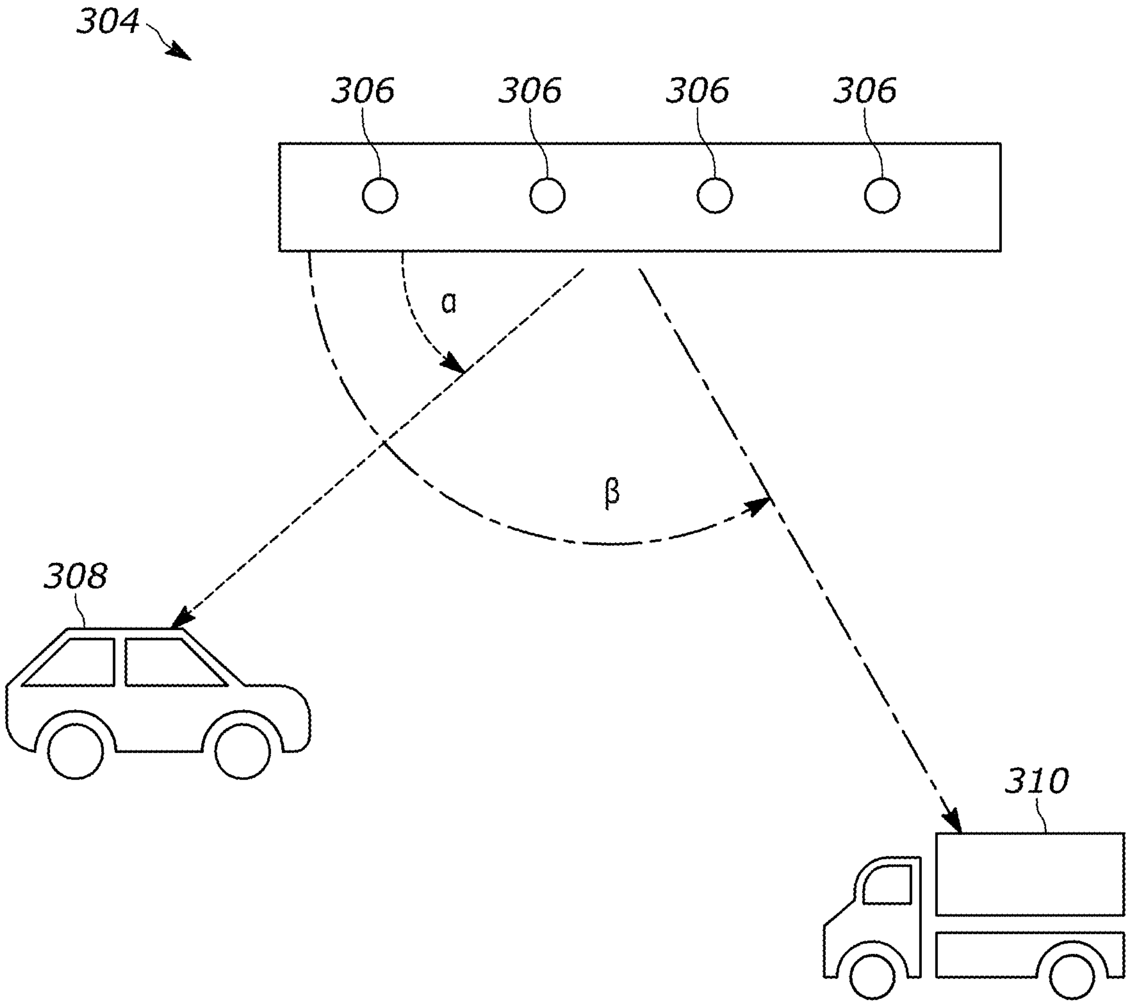
FIG. 3B generally illustrates a portion of a data capturing system according to the principles of the present disclosure.

As is generally illustrated in FIGS. 3A and 3B, an example system 300 may include an image (e.g., image and/or video) capturing device 302, an audio capturing array 304, and the computing system 202. The system may receive, from the image capturing device 302, video stream data associated with a data capture environment. The system 202 may be configured to perform video object detection to identify one or more objects in corresponding images of the video stream data. The system 202 may receive, from the audio capturing array 304, audio stream data that corresponds to at least a portion of the video stream data. The audio capturing array 304 may include one or more microphones 306 or other suitable audio capturing devices. The systems and methods described herein may be configured to label, using output from at least a first machine learning model (e.g., such as the machine learning model 210 or other suitable machine learning model configured to provide output including one or more object or event detection predictions), at least some objects of the video stream data and/or audio stream data.

The system 202 may calculate (e.g., using at least one probabilistic-based function or other suitable technique or function), based on at least one data capturing characteristic, at least one offset value for at least a portion of the audio stream data that corresponds to at least one labeled object of the video stream data. The system 202 may synchronize, using at least the at least one offset value, at least a portion of the video stream data with the portion of the audio stream data that corresponds to the at least one labeled object of the video stream data. The at least one data capturing characteristic may include one or more characteristics of the at least one image capturing device, one or more characteristics of the at least one audio capturing array, one or more characteristics corresponding to a location of the at least one image capturing device relative to the at least one audio capturing array, one or more characteristics corresponding to a movement of an object in the video stream data, one or more other suitable data capturing characteristics, or a combination thereof.

The system 202 may label, using one or more labels of the labeled objects of the video stream data and the at least one offset value, at least the portion of the audio stream data that corresponds to the at least one labeled object of the video stream data. Each respective label may include an event type, an event start indicator, and an event end indicator. The system 202 may generate training data using at least some of the labeled portion of the audio stream data. The system 202 may train a second machine learning model using the training data. The system 202 may detect, using the second machine learning model, one or more sounds associated with audio data provided as input to the second machine learning model. The second machine learning model may include any suitable machine learning model and may be configured to perform any suitable function, such as those described herein with respect to FIGS. 4-11.

Figure 3C:
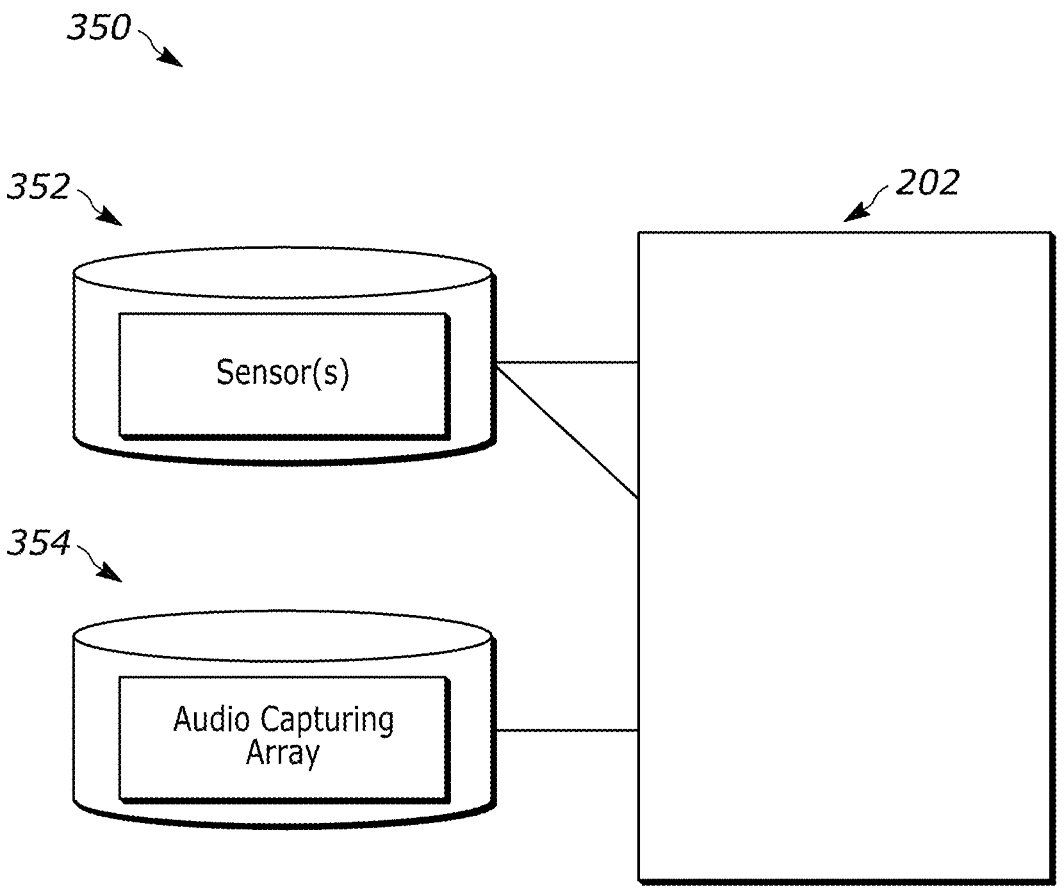
FIG. 3C generally illustrates an alternative audio data labeling system, according to the principles of the present disclosure.

In some embodiments, as is generally illustrated in FIG. 3C, the computing system 202 may be configured to label audio data based on sensor data received from one or more sensors, such as those described herein or any other suitable sensor or combination of sensors. The system 202 may receive, from the audio capturing array 354 or any suitable audio capturing device, such as one or more of the microphones 306 or other suitable audio capturing device, audio stream data associated with a data capture environment. It should be understood that the audio capturing array 354 may include features similar to those of the audio capturing array 304 and may include any suitable number of audio capturing devices. The system 202 may receive, from at least one sensor (e.g., such as the sensor 352) that is asynchronous relative to the audio capturing array 354, sensor data associated with the data capture environment. The sensor 354 may include at least one of an induction coil, a radar sensor, a LiDAR sensor, a sonar sensor, an image capturing device, any other suitable sensor, or a combination thereof. The audio capturing array 354 may be remotely located from the sensor 354, proximately located to the sensor 354, or located in any suitable relationship to the sensor 354.

The system 202 may identify, using output from at least a first machine learning model, such as the machine learning model 210 or other suitable machine learning model, at least some events in the sensor data. The machine learning model 210 may be configured to provide output including one or more event detection predictions based on the sensor data. The system 202 may synchronize at least a portion of the sensor data associated with the portion of the audio stream data that corresponds to the at least one event of the sensor data. The system 202 may label, using one or more labels extracted for respective events of the sensor data value, at least the portion of the audio stream data that corresponds to the at least one event of the sensor data. Each respective label may include an event type, an event start indicator, and an event end indicator. The system 202 may generate training data using at least some of the labeled portion of the audio stream data. The system 202 may train a second machine learning model using the training data. The system 202 may detect, using the second machine learning model, one or more sounds associated with audio data provided as input to the second machine learning model. The second machine learning model may include any suitable machine learning model and may be configured to perform any suitable function, such as those described herein with respect to FIGS. 4-11.

The systems and methods of the present disclosure (e.g., any of the systems 100, 200, etc.) are configured to train a vision model (e.g., the model 210) to perform camera-agnostic depth estimation. In an example, the model 210 is trained using ERP images as described below in more detail.

Figure 4A:
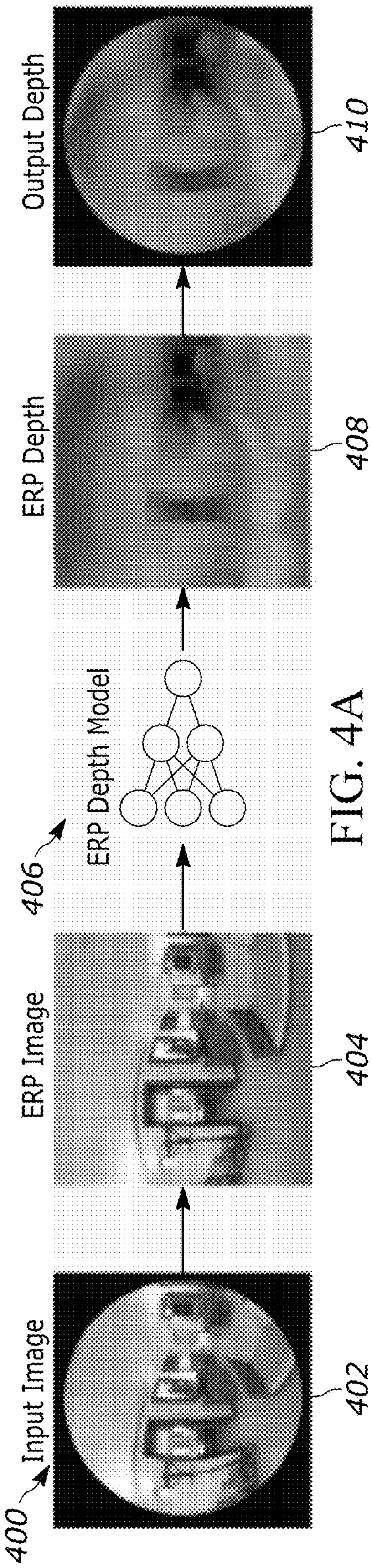
FIG. 4A illustrates an example depth estimation pipeline according to the principles of the present disclosure.

FIG. 4A illustrates an example depth estimation pipeline 400 according to the present disclosure. For example, one or more computing devices, processors, or processing devices are configured to execute instructions to implement the functions of the pipeline 400, such as one or more of the processors of the systems (e.g., 100, 200, etc.) described herein.

An input image 402 captured by a camera in an original camera space (e.g., any arbitrary camera/lens) is converted into an ERP image 404. The ERP image 404 is processed by a vision model 406, such as an ERP depth model, trained to generate an ERP depth map 408 (e.g., in ERP space). The ERP depth map 408 can then be converted back to the original camera space to output a final depth estimation 410.

Figure 4B:
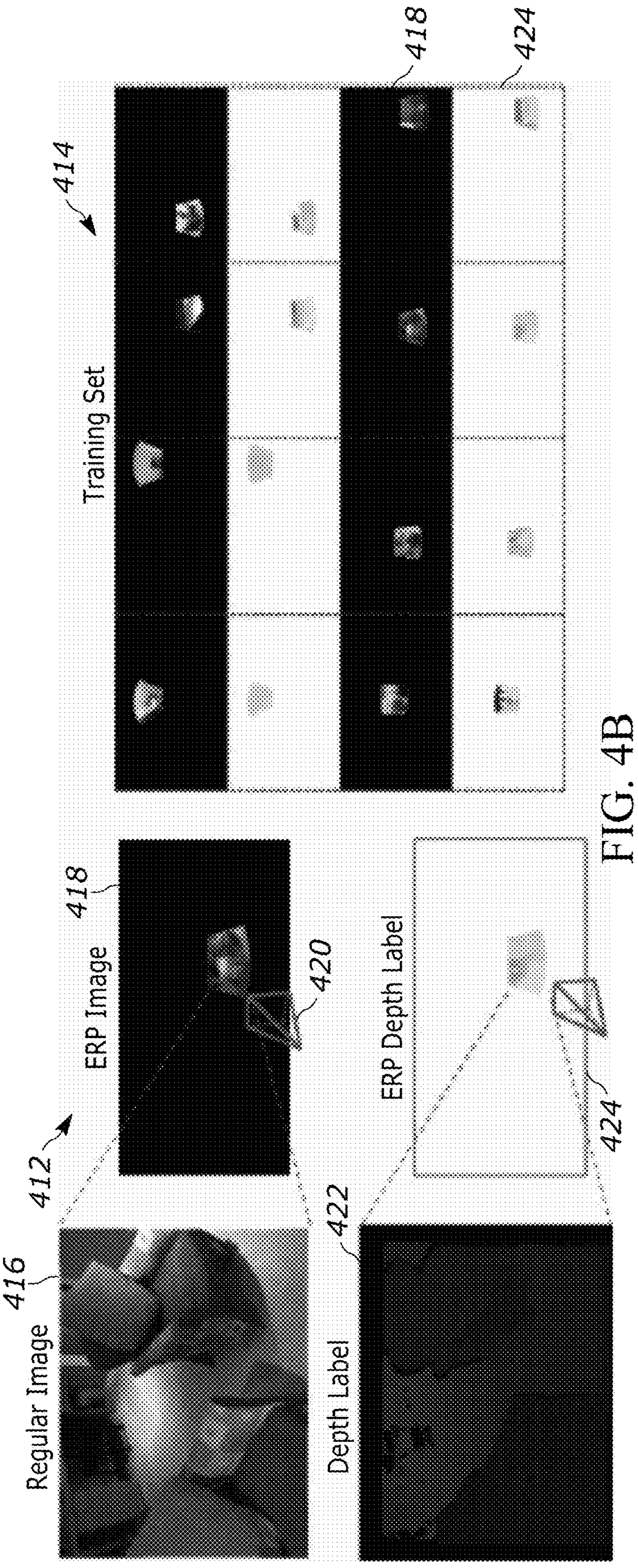
FIG. 4B illustrates an example training preparation pipeline for a training set 414 according to the principles of the present disclosure.

FIG. 4B illustrates an example training preparation pipeline 412 for a training set 414 (e.g., a training set of image patches). For example, one or more computing devices, processors, or processing devices are configured to execute instructions to implement the functions of the pipeline 412, such as one or more of the processors of the systems (e.g., 100, 200, etc.) described herein. Training of a vision model configured to perform ERP depth estimation according to the present disclosure eliminates or reduces the need to collect ERP images having ground-truth depth. First, camera orientations with respect to a reference plane, such as a ground plane, are estimated for captured, non-ERP images (i.e., orientation of a camera used to capture an input image 416). Second, the captured input image 416 is projected to a corresponding region in an ERP space based on the estimated camera orientation to generate an ERP image 418 (which may be referred to as an image patch). In some examples, the input image 416 is first projected onto a spherical surface and then the image is unfolded/projected from the spherical surface to the ERP space. In other examples, the input image 416 is projected directly to the ERP space. An example estimated camera orientation is shown at 420. In an example, the ERP space is defined with an X-Y plane parallel to a ground plane and a Z axis pointing upward.

The captured image 416 may have an associated depth label 422 (e.g., a ground-truth depth label). The depth label 422 identifies actual distances of each object or feature in a scene or environment from the camera used to capture the image 416. For example, the depth label 422 indicates ground-truth distances of each pixel in the image 416 from the camera. In some examples, the depth label 422 is provided as a depth map assigning each pixel a corresponding depth value (e.g., a numerical value indicating a distance from the camera, color coding, color/shading gradient, etc.). In an example, the image 416 and the depth label 422 are obtained from a public or other dataset of captured images and corresponding ground-truth depth labels or maps.

The depth label 422 is projected into an ERP space to generate an ERP depth label or map 424 (which may be referred to as a depth patch). In other words, the ERP depth label 424, rather than representing ground-truth depths/distances for the image 416, indicates depth of pixels in the image 416 subsequent to conversion to the ERP space. Accordingly, the training set 414 used to train the vision model of the present disclosure includes pairs of ERP images (e.g., image patches from the ERP images 418), camera orientations, and corresponding ERP depth labels. In this manner, the vision model is trained to estimate/predict depths for new images.

Figure 4C:
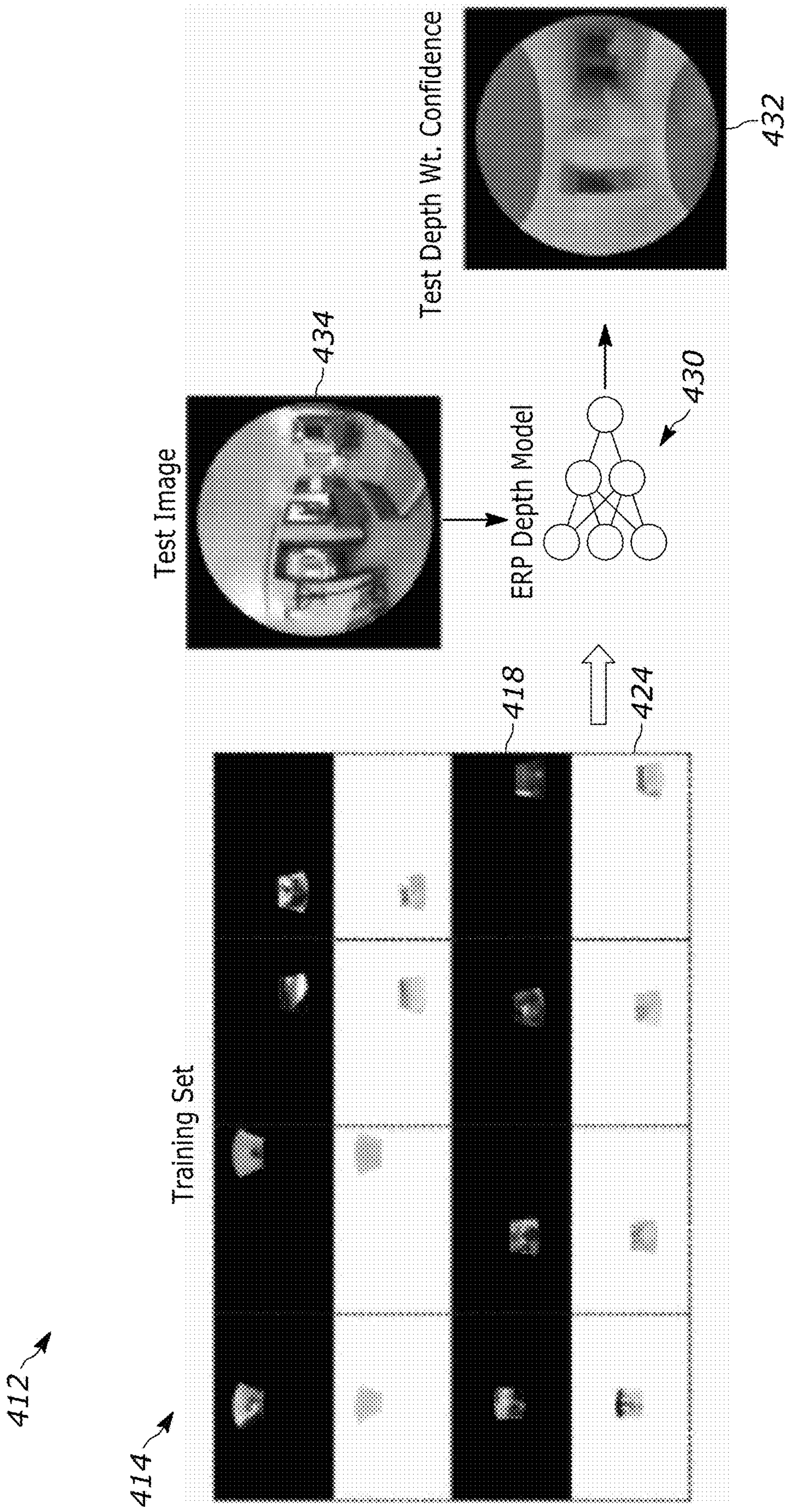
FIG. 4C illustrates an example model training process for an equirectangular (ERP) depth model using partially visible datasets and subsequent testing of the ERP depth model according to the principles of the present disclosure.

FIG. 4C illustrates an example model training process for an ERP depth model 430 using partially visible datasets and subsequent testing of the ERP depth model 430. As used herein, the training set 414 of image patches of ERP images may be referred to as “partially visible” datasets. In other words, the image patches may show only portions of respective images (i.e., rather than full ERP images). In an example, visible portions of each training sample ERP image 418 and corresponding portions each ERP depth label 424 are cropped and these pairs of cropped images 418 and labels 424 are used to train the ERP depth model 430. For example, the ERP depth model 430 is configured to implement a convolutional neural network (CNN), such as a ResNet-50 or ResNet-101 encoder and a corresponding decoder.

The cropped image patches 418 are provided to the ERP depth model 430 as inputs along with the depth patches 424. During training, the depth patches 424 provide ground-truth depth supervision of an output (e.g., a depth estimation output 432) of the ERP depth model 430. Subsequent to training, the ERP depth model 430 is configured to generate the depth estimation output 432 for the test images 434. In some examples, the depth estimation output 432 corresponds to an ERP depth estimation (i.e., a depth of an image as converted to an ERP image) that is subsequently converted to a non-ERP depth estimation. In an example, as shown, the depth estimation output 432 is a depth map or label. In an example, the depth map is an image where each pixel indicates a distance of a respective pixel of the input image (or ERP image) from the camera. Distance may be represented by pixel value or intensity.

Outputs of the ERP depth model 430 can be used for various downstream object detection and image recognition tasks, such as control of autonomous vehicles, robotics, augmented/virtual reality (AR/VR) systems, etc.

Accordingly, the ERP depth model 430 of the present disclosure is configured to perform accurate depth estimation/prediction for arbitrary camera types/lenses. Further, training of the ERP depth model 430 does not require a new collection of ERP images with respective ground-truth depth maps. Instead, the ERP depth model 430 is trained using readily available regular (i.e., non-ERP) images with ground-truth depth maps.

Figure 4D:
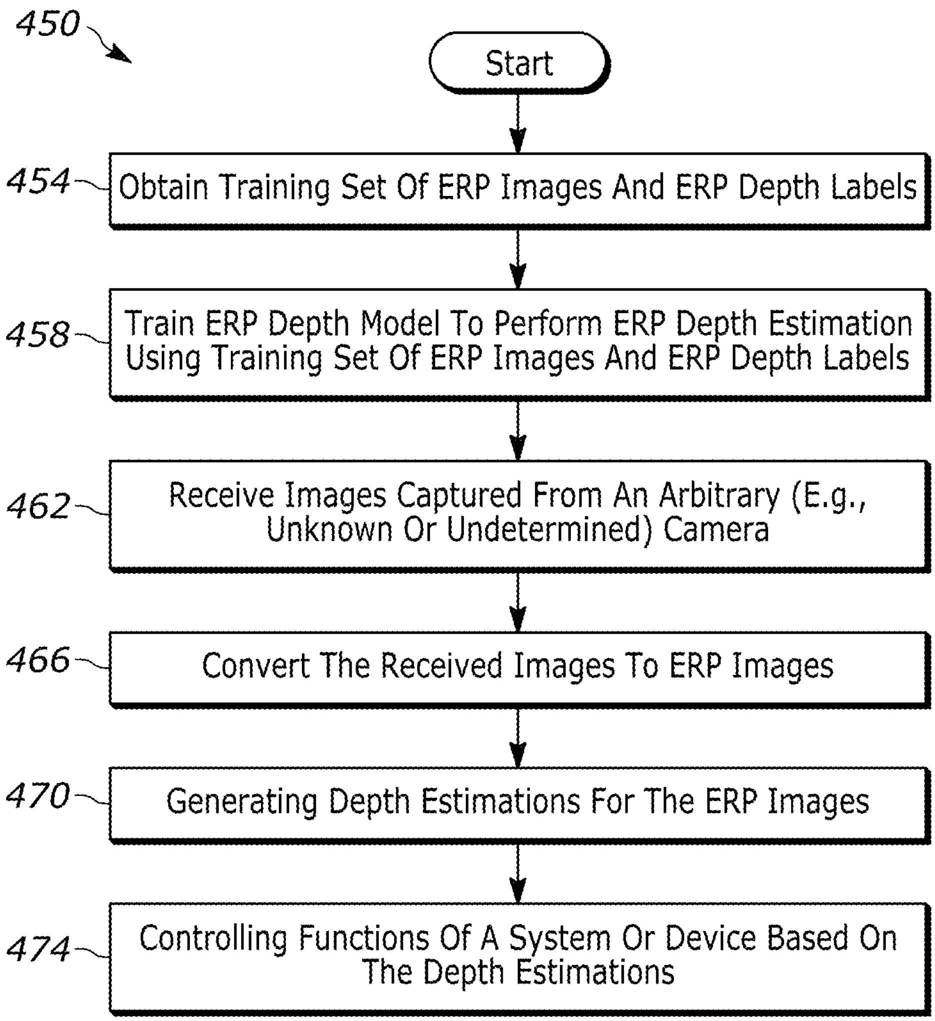
FIG. 4D illustrates steps of an example camera-agnostic depth estimation method according to the principles of the present disclosure.

FIG. 4D illustrates steps of an example method 450 for implementing (e.g., training and subsequently performing depth estimation with) an ERP depth model according to the principles of the present disclosure. For example, one or more processors or processing devices are configured to execute instructions to implement the method 450, such as one or more of the processors of the systems described herein.

At 454, the method 450 includes obtaining a training set for training the ERP depth model. For example, obtaining the training set may include estimating camera orientations for captured, non-ERP images, projecting the images to a corresponding region in an ERP space based on the estimated camera orientation to generate ERP images, and obtaining ERP depth labels or maps for the ERP images as described above with respect to FIG. 4B.

At 458, the method 450 includes training the ERP depth model with the training set to perform ERP depth estimation. For example, training the ERP depth model includes providing the ERP depth model with the training set of ERP images and corresponding depth labels or maps. In some examples, the ERP images include ERP image patches and the depth labels include depth patches of the ERP image pages (e.g., cropped portions of ERP images patches and depth labels/maps, respectively).

At 462, the method 450 includes receiving images captured from a camera having any type of lens. In other words, the camera is an arbitrary (i.e., unknown or undetermined) camera.

At 466, the method 450 includes converting the images to ERP images. In some examples, the input images are first projected onto a spherical surface and then unfolded/projected from the spherical surface to the ERP space to obtain the ERP images. In other examples, the input images are projected directly to the ERP space.

At 470, the method 450 includes generating depth estimations for the ERP images using the ERP depth model. Generating the depth estimations may include generating ERP depth estimations and converting the ERP depth estimations to non-ERP depth estimations.

At 474, the method 450 includes controlling one or more functions of a system, device, machine, etc. based on the depth estimations. For example, the depth estimations can be used for various downstream object detection and image recognition tasks, such as control of autonomous vehicles, robotics, AR/VR systems, etc. In some examples, the method 450 includes controlling functions of any of the systems described below in FIGS. 5-11.

Figure 5:
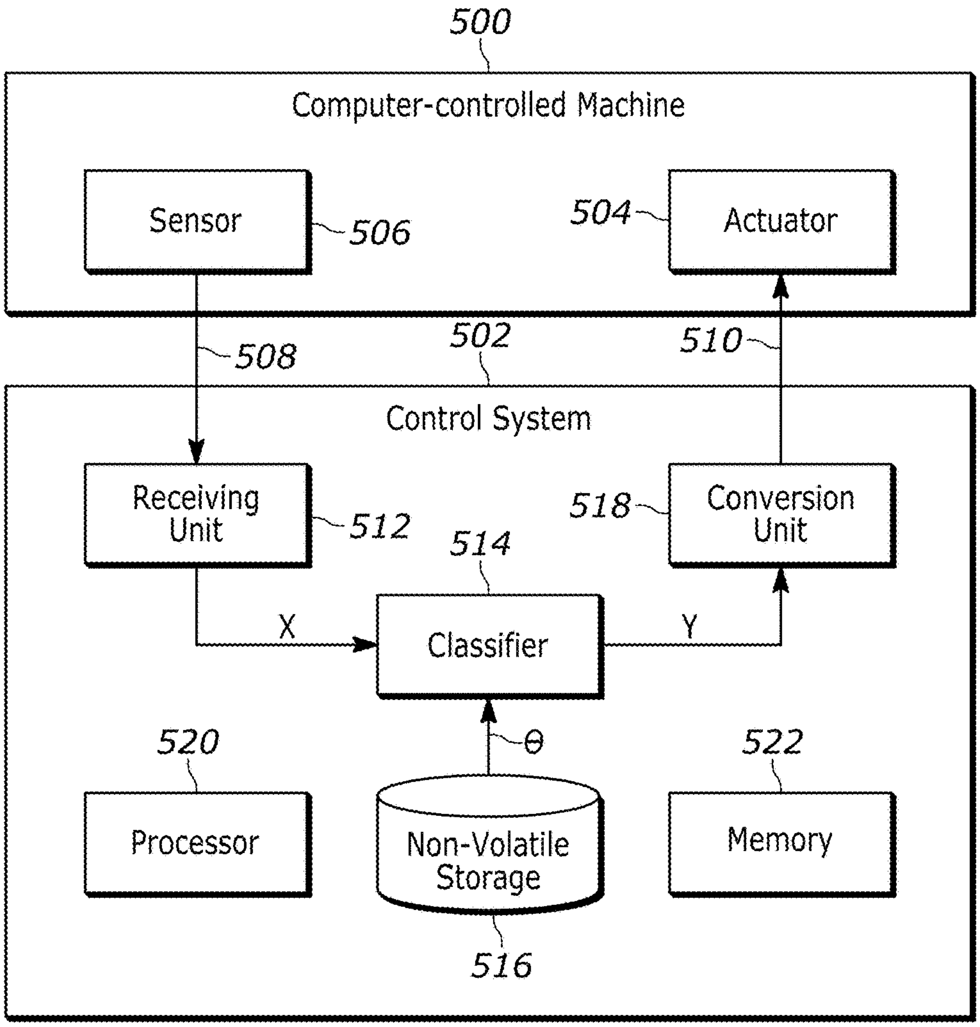
FIG. 5 illustrates a schematic diagram of an interaction between a computer-controlled machine and a control system according to the principles of the present disclosure.

FIGS. 5-11 depict example systems and devices that may implement vision models, such as ERP depth models, according to the present disclosure. FIG. 5 depicts a schematic diagram of an interaction between a computer-controlled machine 500 and control system 502. In an example, the control system 502 is configured to control the computer-controlled machine 500 by executing an ERP depth model in accordance with the principles of the present disclosure. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic, and motion sensors. In some embodiments, sensor 506 is an optical sensor configured to sense optical images of an environment proximate to computer-controlled machine 500. An ERP depth model according to the present disclosure may perform depth estimation for the optical images as described herein.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to produce each input signal x. Input signal x may include data corresponding to an image recorded by sensor 506.

Control system 502 includes classifier 514. Classifier 514 may be configured to classify input signals x into one or more labels using a machine learning (ML) algorithm, such as a neural network. For example, the classifier 514 corresponds to the classifier 408 described above. Classifier 514 is configured to be parametrized by parameters, such as those described above (e.g., parameter 0). Parameters 0 may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more anomaly detection methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the anomaly detection methodologies as disclosed herein. Non-volatile storage 516 may also include data supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
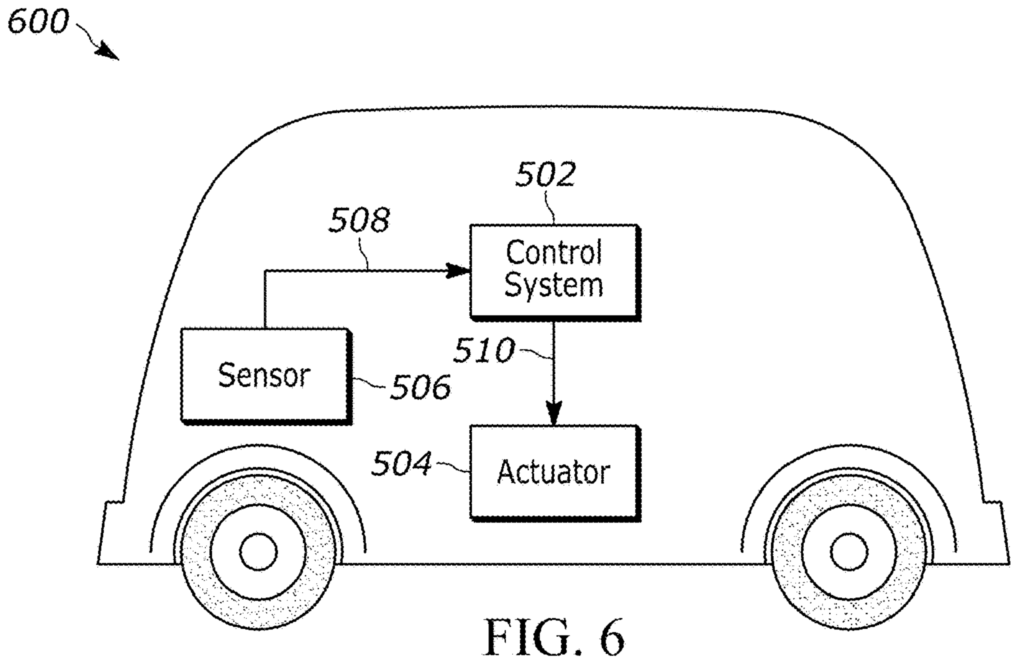
FIG. 6 illustrates a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. In an example, the control system 502 is configured to control the vehicle 600 by executing an ERP depth model in accordance with the principles of the present disclosure. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the proximity of objects to vehicle 600, such as a depth estimation obtained by an ERP depth model. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
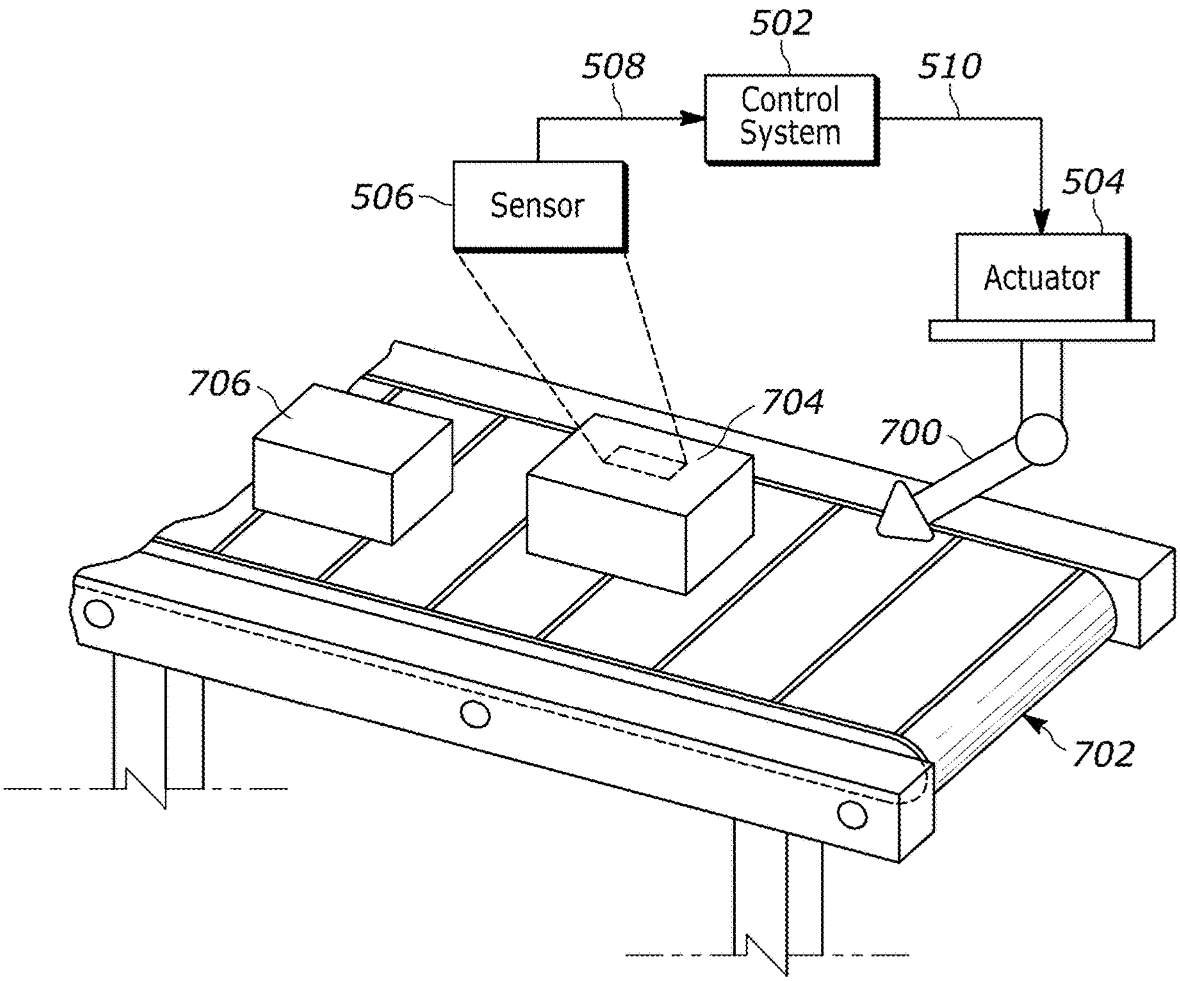
FIG. 7 illustrates a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., a manufacturing machine), such as a punch cutter, a cutter or a gun drill, of manufacturing system 702, such as part of a production line. Control system 502 may be configured to control actuator 504, which is configured to control system 700 (e.g., manufacturing machine). In an example, the control system 502 is configured to control the system 700 by executing an ERP depth model in accordance with the principles of the present disclosure.

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
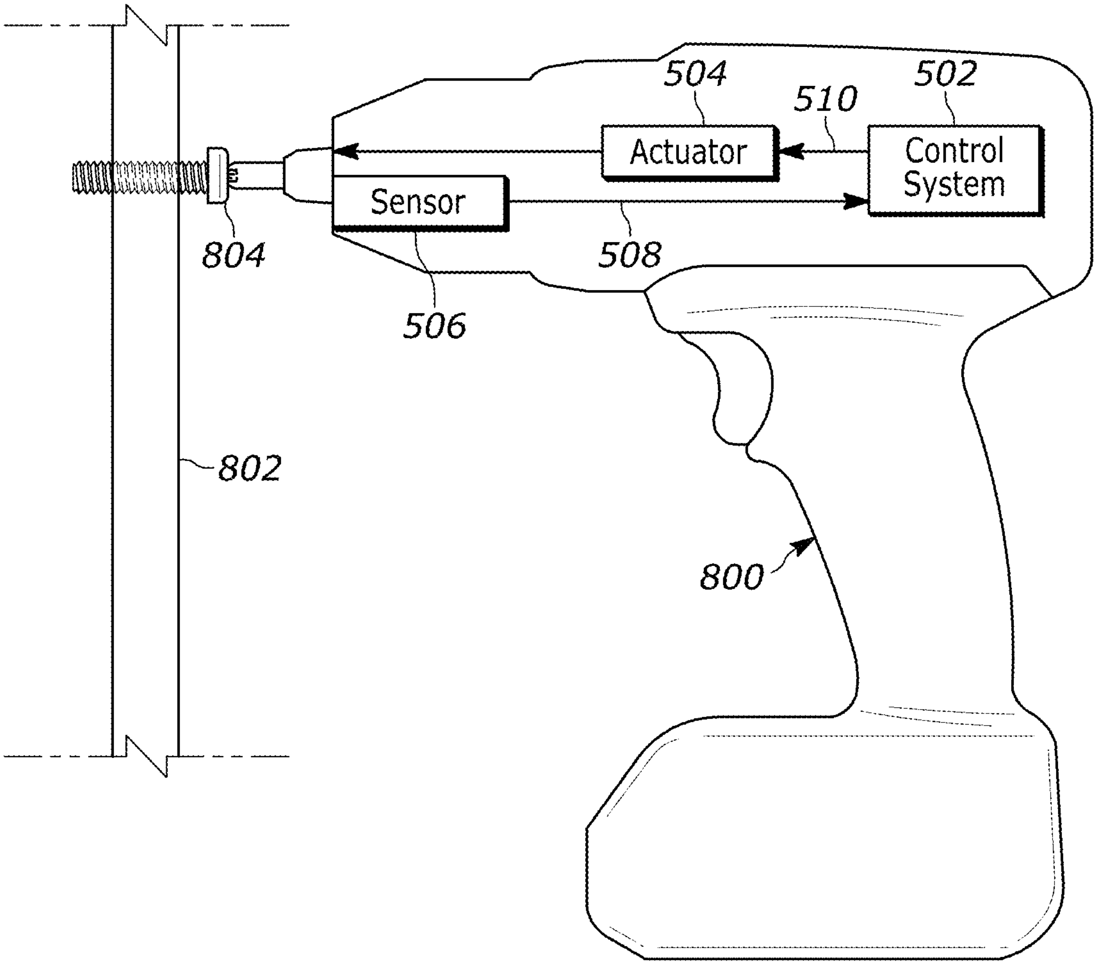
FIG. 8 illustrates a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800. In an example, the control system 502 is configured to control the power tool 800 by executing an ERP depth model in accordance with the principles of the present disclosure.

Sensor 506 of power tool 800 may be an optical sensor configured to capture one or more properties of work surface 802 and/or fastener 804 being driven into work surface 802, which may include performing depth estimation using an ERP depth model. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figure 9:
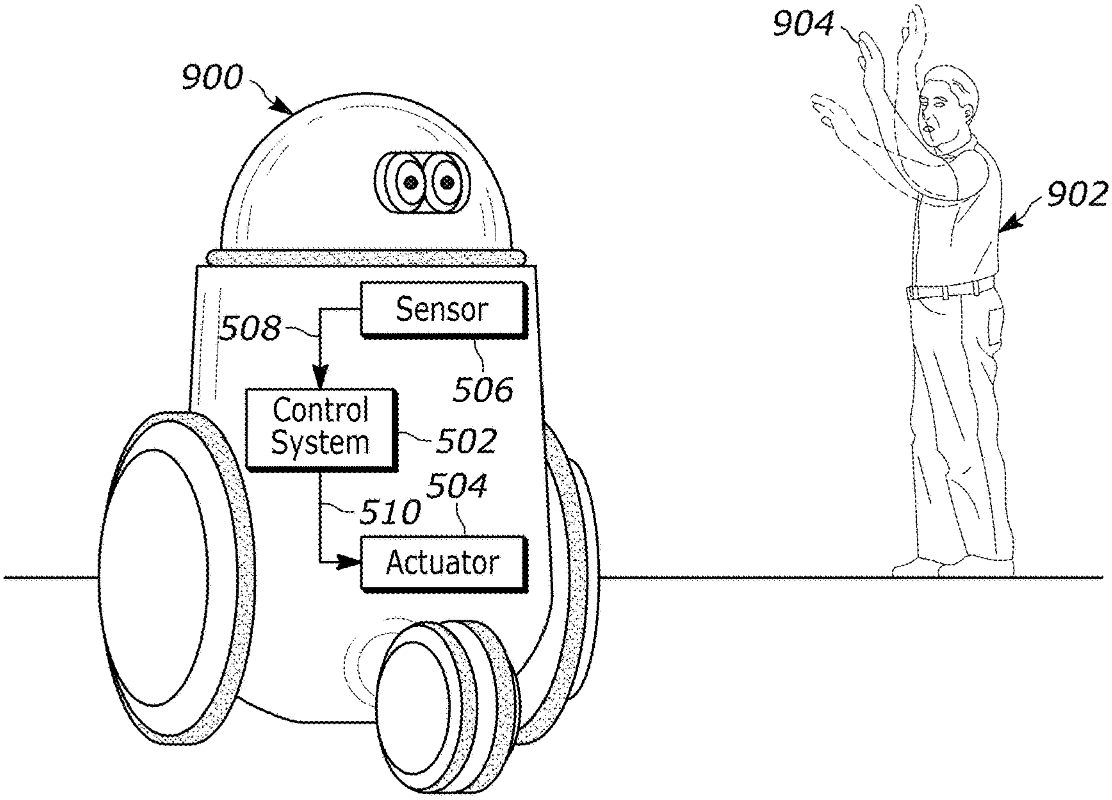
FIG. 9 illustrates a schematic diagram of the control system of FIG. 5 configured to control an automated personal assistant.

FIG. 9 depicts a schematic diagram of control system 502 configured to control an automated personal assistant 900 (e.g., a robot). Control system 502 may be configured to control actuator 504, which is configured to control automated personal assistant 900. Automated personal assistant 900 may be configured to control a domestic appliance, such as a washing machine, a stove, an oven, a microwave or a dishwasher. In an example, the control system 502 is configured to control the automated personal assistant 900 by executing an ERP depth model in accordance with the principles of the present disclosure.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506, which may include performing depth estimation using an ERP depth model. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

Figure 10:
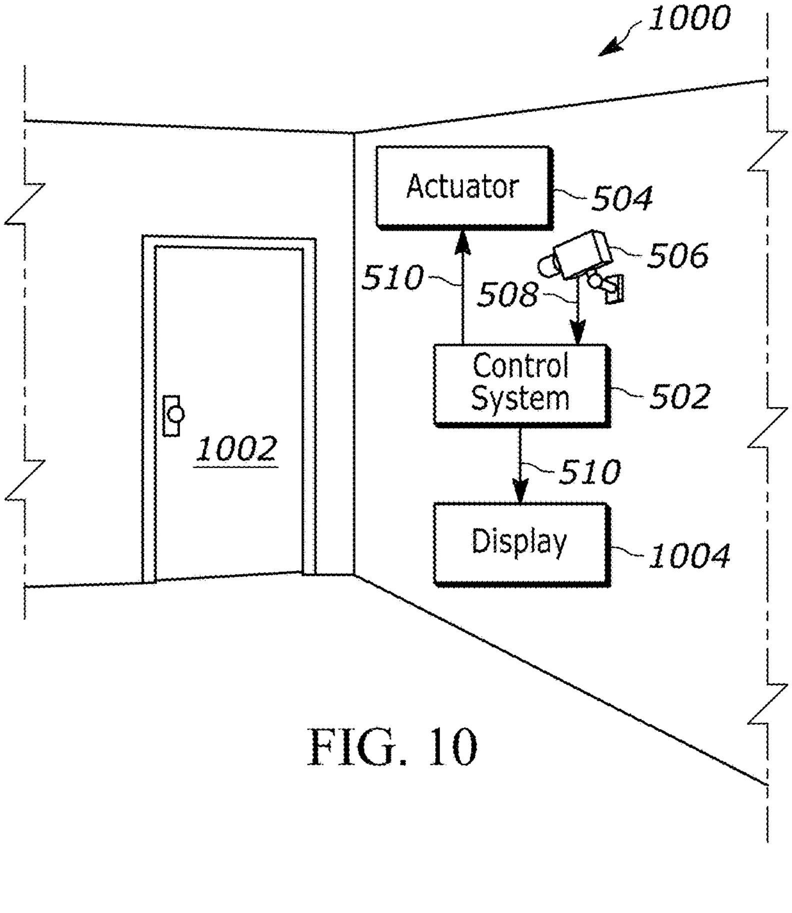
FIG. 10 illustrates a schematic diagram of the control system of FIG. 5 configured to control a monitoring system, such as a control access system or a surveillance system.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face. In an example, the control system 502 is configured to control the monitoring system 1000 by executing an ERP depth model in accordance with the principles of the present disclosure.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
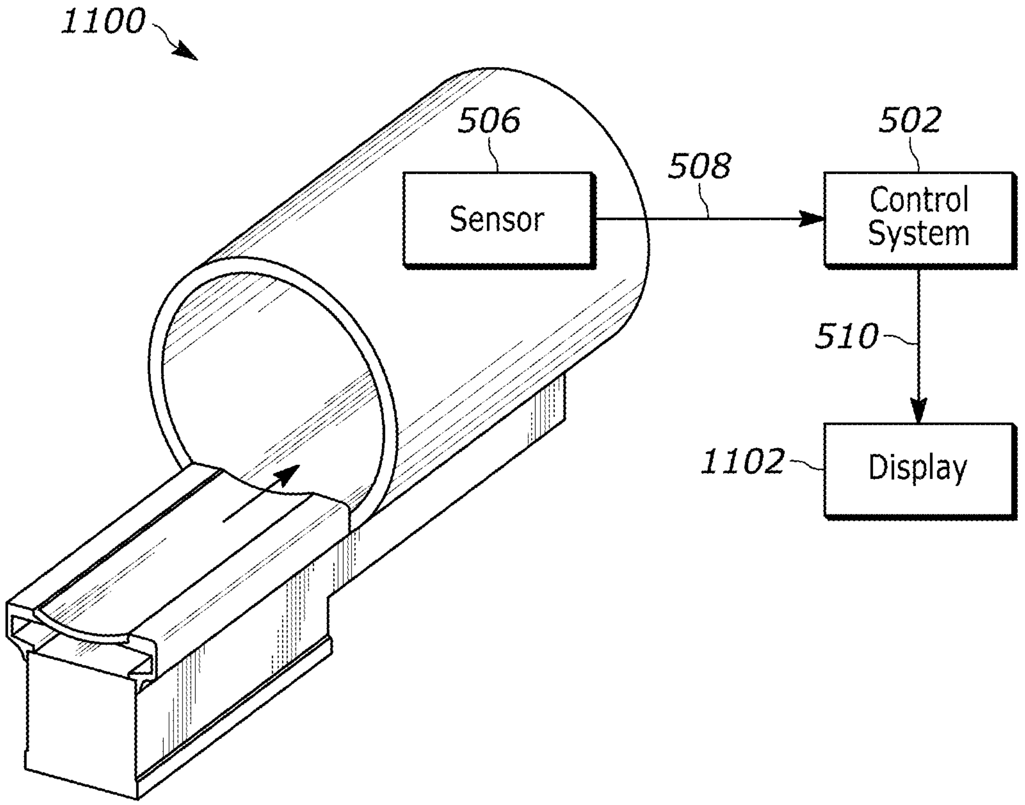
FIG. 11 illustrates a schematic diagram of the control system of FIG. 5 configured to control an imaging system, for example an MRI apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. In an example, the control system 502 is configured to control the imaging system 1100 by executing an ERP depth model in accordance with the principles of the present disclosure. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method of performing depth estimation for images, the method comprising, at one or more processing devices:

receiving an input image captured by a camera;

converting the input image to an equirectangular (ERP) image in an ERP space;

performing depth estimation for the ERP image, wherein performing the depth estimation includes determining, using an ERP depth model, respective distances of features in the ERP image from the camera;

generating an ERP depth output including an ERP depth map of the respective distances;

converting the ERP depth map from the ERP space to a depth map in a non-ERP space of the input image;

generating a depth estimation output based on the depth map in the non-ERP space; and controlling one or more functions of a device based on the depth estimation output.

2. The method of claim 1, wherein the camera is a monocular camera.

3. The method of claim 1, wherein converting the input image to the ERP image includes projecting a portion of the image onto a spherical surface to obtain a spherical image and projecting the spherical image into the ERP space to obtain the ERP image.

4. The method of claim 1, wherein the ERP depth model includes a convolutional neural network.

5. The method of claim 1, further comprising training the ERP depth model using a training set of ERP images and corresponding ERP depth maps.

6. The method of claim 5, wherein training the ERP depth model includes converting non-ERP images and corresponding non-ERP depth maps to the ERP images and the corresponding ERP depth maps.

7. The method of claim 6, wherein training the ERP depth model includes providing, as inputs to the ERP depth model, patches of the ERP images and patches of the corresponding ERP depth maps.

8. A computing device configured to perform depth estimation for images, the computing device including a processing device configured to execute instructions stored in memory to:

receive an input image captured by a camera;

convert the input image to an equirectangular (ERP) image in an ERP space;

perform depth estimation for the ERP image, wherein performing the depth estimation includes determining, using an ERP depth model, respective distances of features in the ERP image from the camera;

generate an ERP depth output including an ERP depth map of the respective distances;

convert the ERP depth map from the ERP space to a depth map in a non-ERP space of the input image;

generate a depth estimation output based on the depth map in the non-ERP space; and control one or more functions of a device based on the depth estimation output.

9. The computing device of claim 8, wherein the camera is a monocular camera.

10. The computing device of claim 8, wherein converting the input image to the ERP image includes projecting a portion of the image onto a spherical surface to obtain a spherical image and projecting the spherical image into the ERP space to obtain the ERP image.

11. The computing device of claim 8, wherein the ERP depth model includes a convolutional neural network.

12. The computing device of claim 8, wherein the computing device is configured to train the ERP depth model using a training set of ERP images and corresponding ERP depth maps.

13. The computing device of claim 12, wherein training the ERP depth model includes converting non-ERP images and corresponding non-ERP depth maps to the ERP images and the corresponding ERP depth maps.

14. The computing device of claim 13, wherein training the ERP depth model includes providing, as inputs to the ERP depth model, patches of the ERP images and patches of the corresponding ERP depth maps.

15. A computer-controlled machine configured to operate in accordance with a depth estimation output generated by an equirectangular (ERP) depth model, the computer-controlled machine comprising:

a control system configured to receive an input image captured by a camera, convert the input image to an equirectangular (ERP) image in an ERP space, perform depth estimation for the ERP image, wherein performing the depth estimation includes determining, using the ERP depth model, respective distances of features in the ERP image from the camera, generate an ERP depth output including an ERP depth map of the respective distances, convert the ERP depth map from the ERP space to a depth map in a non-ERP space of the input image, generate a depth estimation output based on the depth map in the non-ERP space, and output a control signal based on the depth estimation output; and an actuator configured to control an operation of the computer-controlled machine based on the control signal.

16. The computer-controlled machine of claim 15, wherein converting the input image to the ERP image includes projecting a portion of the image onto a spherical surface to obtain a spherical image and projecting the spherical image into the ERP space to obtain the ERP image.

17. The computer-controlled machine of claim 15 corresponding to one of a vehicle, a robot, a tool, a manufacturing machine, a monitoring system, and an image system.

* * * * *